Dec. 15, 1936.  J. V. SCHAVONE  2,064,690
SKATE WHEEL
Filed June 2, 1934
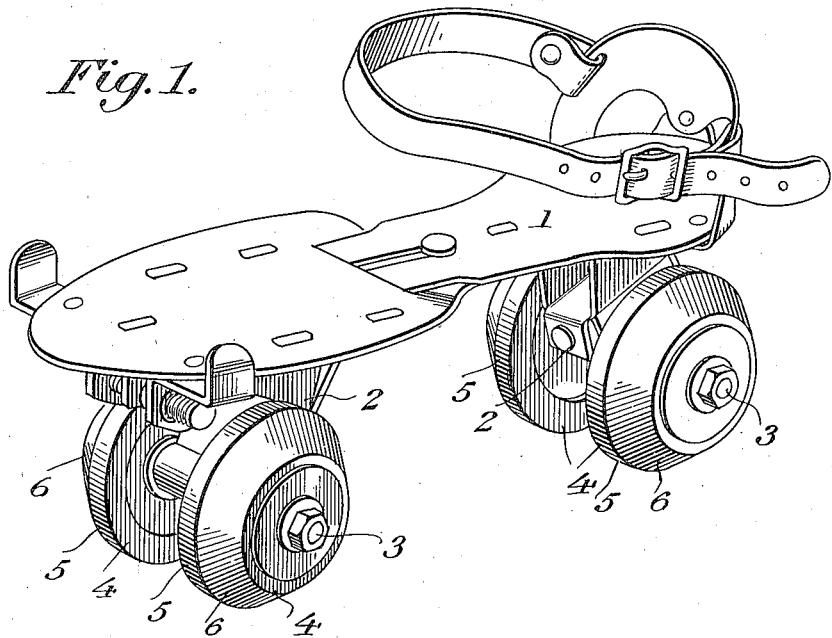
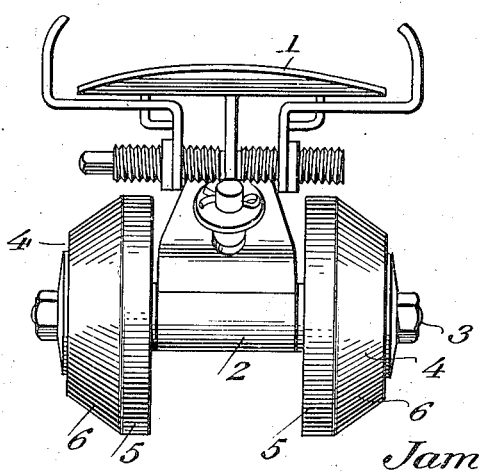
James V. Schavone
INVENTOR
BY Victor J. Evans & Co.
ATTORNEYS Patented Dec. 15, 1936

2,064,690

UNITED STATES PATENT OFFICE 2,064,690

SKATE WHEEL

James V. Schavone, Munhall, Pa.

Application June 2, 1934, Serial No. 728,755

2 Claims. (Cl. 208—181)

This invention relates to rollers for roller skates and has for the primary object the provision of rollers with a novel construction of treads which will require less effort to propel and will facilitate the all desirable swaying side to side motion so essential to balanced skating and which will render skating a more enjoyable sport.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a perspective view illustrating a skate equipped with rollers constructed in accordance with my invention.

Figure 2 is an end elevation illustrating the same.

Referring in detail to the drawing, the numeral 1 indicates a conventional type of roller skate having front and rear trucks 2 carrying axles 3 on which are journaled rollers 4 forming the subject matter of the present invention. Each roller includes tread portions 5 and 6. The tread portion 5 is comparatively narrow in width while the tread portion 6 is wider in width than the tread portion 5 and is of substantially conical shape and merges with the tread portion 5. The tread portion 5 permits minimum amount of traction contact with a skating surface for facilitating locomotion with more speed and smoothness by the skater. The beveled or substantially conical-shaped tread 6 in conjunction with the tread 5 allows for tilting in either direction of the foot by the skater which enhances the ease of swaying with a side to side motion and further permits the skater to more readily negotiate all sorts of arcs and curves within the category of good skating.

Having described the invention, I claim:

1. A pair of spaced skate rollers, and an axle at the extremities of which they are rotatably mounted, each of said rollers having a pair of tread portions of which one defines a cylindrical surface of comparatively narrow width and the other the slant surface of a conical frustum, the frusto-conical surface being next adjacent the extremity of the shaft and merging into the cylindrical surface, the latter constituting the surface bearing tread when the roller is upright and the frusto-conical surface constituting such tread when the roller is making a turn.

2. A skate roller formed with a comparatively narrow peripheral tread and an adjacent lateral frusto-conical tread, the former constituting the active tread only when the roller is upright and the latter the active tread only when the roller is inclined in making a turn.

JAMES V. SCHAVONE.